UNITED STATES PATENT OFFICE.

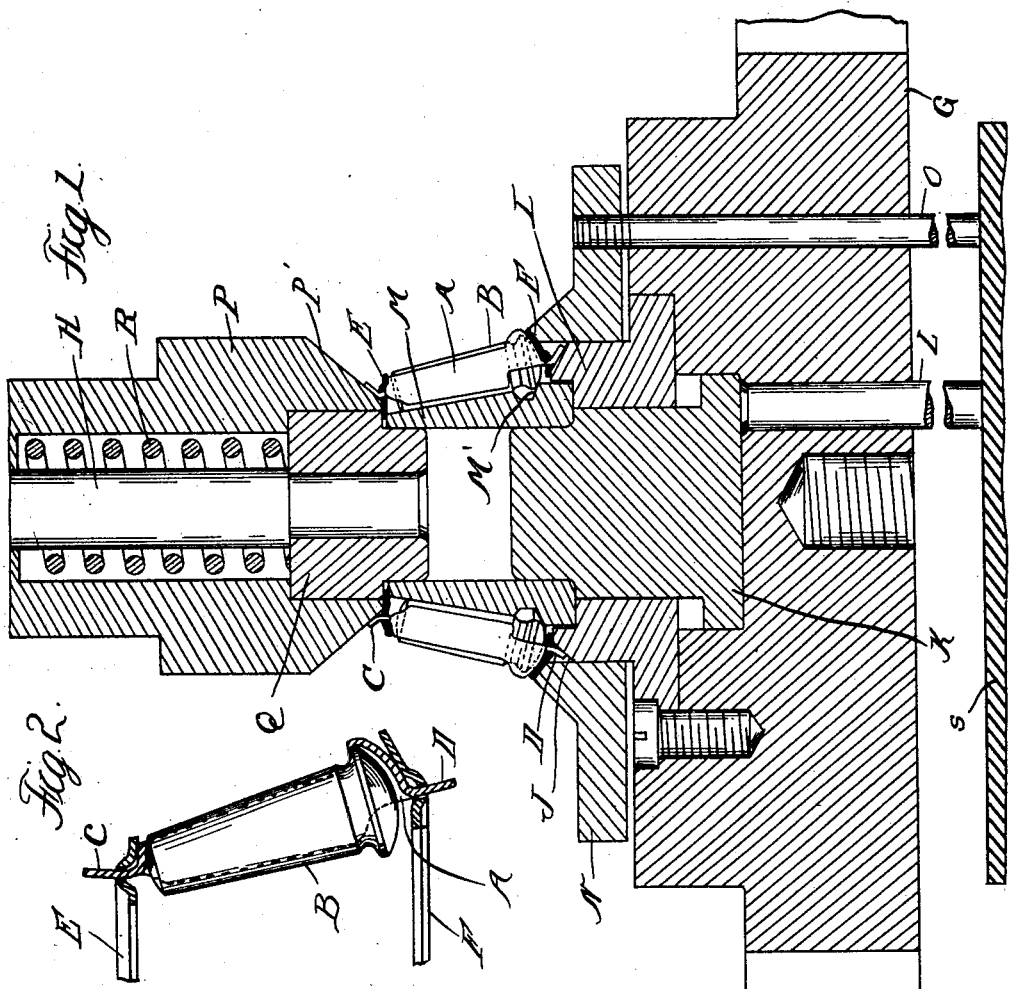
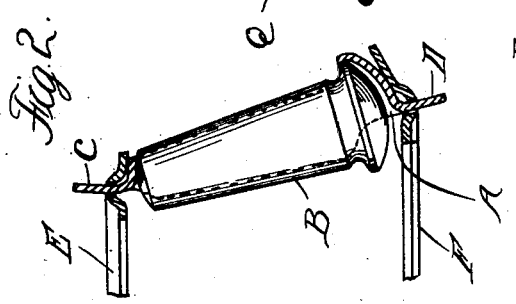
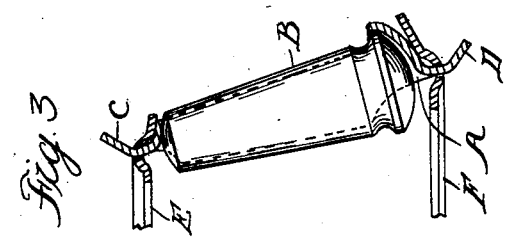

JEREMIAH BINGHAM, OF TOLEDO, OHIO, ASSIGNOR TO THE BOCK BEARING COMPANY, OF TOLEDO, OHIO, A CORPORATION OF OHIO.

MACHINE FOR CLENCHING ROLLER-BEARING CAGES.

1,383,376.  Specification of Letters Patent.  Patented July 5, 1921.

Application filed October 4, 1917. Serial No. 194,678.

*To all whom it may concern:*

Be it known that I, JEREMIAH BINGHAM, a citizen of the United States of America, residing at Toledo, in the county of Lucas and State of Ohio, have invented certain new and useful Improvements in Machines for Clenching Roller-Bearing Cages, of which the following is a specification, reference being had therein to the accompanying drawings.

The invention relates to the manufacture of roller bearings of that type in which individual roller-holding housings are secured to each other by a connector ring. To impart the requisite rigidity to the cage it is desirable to employ a pair of connector rings arranged at opposite ends of the individual housings or cells, and the attachment is made by tongues projecting from these cells and passing through apertures in the rings. In the present state of the art it has been found expedient to manually assemble the individual cells and connector rings, this being accomplished by the assistance of a suitable jig for supporting the parts. To complete the cage the cells must be accurately alined and rigidly attached to their connector rings, but before this step can be carried out it is necessary to impart an initial bending to the tongues sufficient to hold them from disengagement. The present invention relates to a machine for accomplishing this function, the construction being as follows:

In the drawings:

Figure 1 is a vertical central section through the machine;

Figs. 2 and 3 are sections through the cage respectively before and after the operation of the machine.

A are the individual cells or housings of the roller bearing cage, each having a roller B inclosed therein and the cells being provided at opposite ends with projecting tongues C and D. These tongues pass through suitably spaced apertures in the connector rings E and F which are arranged at opposite ends of the cells, the arrangement after assembly being illustrated in Fig. 2. The operation to be performed by the machine is to bend all of the tongues so as to incline outward, as shown in Fig. 3, thereby preventing disengagement of the cells and also placing the structure in condition for the final clenching and closing operation. The machine for performing this operation comprises a bed G and plunger H of a press of any suitable construction. Upon the bed is mounted an annular die member I which has a conical face J for engaging the lower tongues D. Concentric with this annular die member is a member K vertically adjustable in relation to the bed and yieldably supported by rods L passing therethrough and engaging a resilient cushion, such as a rubber bed S. Upon the member K is mounted a conical member M, upon which the cage may be placed, the rolls thereof bearing against the outer face of the cone and the ends of the rolls having a bearing upon a flange M' projecting from the member M. N is an annular member surrounding the members K and I and forming a seat for the lower connector ring F of the cage. This member N is also yieldably supported through the medium of rods O engaging the resilient cushion. P is a die member mounted upon the plunger H and having a conical face P' for engaging the tongues C of the cake. Q is a member arranged concentrically within the member P and yieldably pressed by a spring R, said member serving as a holder for the connector ring C during the operation of the die.

In use, the assembled cage is placed by the operator upon the member M while the plunger H is withdrawn. The press is then set in motion, and as the plunger H descends the member Q will first engage and hold the ring E and the member P will then press upon the tongues C, simultaneously bending all of them outward. During this initial operation the members M and K remain stationary, as the pressure exerted by the plunger is not sufficient to compress the resilient cushion. When, however, the first operation is completed and the tongues C are bent outward the member P will then bear directly against the ring E, and through the latter against the member F, pressing this downward. During this movement the whole cage will be carried down, together with the members M, K and N, but the member I remaining stationary, the conical face J thereof will press against the lower tongues D and bend them outward. Thus the operation of bending the tongues on opposite ends of the individual cells is performed successively, but the tongues of all of the cells at the same end are operated upon simultaneously.

What I claim as my invention is:

1. A machine for the purpose described, comprising a bed, an annular conical die member supported thereon, a work support arranged concentric with said annular die member above the same, a resilient yieldable bearing for said work support, an upper conical die member arranged concentric with said lower die member and work support, means for holding the work in place and movable relative to said bed, and means for depressing said work holding means and upper die member, whereby the work is clamped in place and an operation is first performed on the upper portion of the work and the latter with its support is then carried downward to perform an operation on the lower end of the work.

2. A machine for the purpose described, comprising a bed, an annular die member supported thereon, work supporting means concentric with said annular die member and having portions arranged inside and outside thereof, means for yieldably and resiliently supporting both the inner and outer portions of said work supporting means, an upper die member concentric with said lower die member and work supporting means, a member adjacent to said upper die member for holding the work in place, and means for depressing said upper die member to first move the same in relation to said work supporting means and perform an operation on the upper end of the work, and to then carry said work supporting means downward to perform an operation on the lower end of the work.

3. A machine for the purpose described, comprising a bed, an annular conical die member supported thereon, a member vertically slidably secured in said bed concentric with said annular die member, a conical work support mounted on said slidable member, a coöperating work-supporting member arranged outside of said die member, rods for supporting said inner and outer work-supporting members passing through said bed, a resilient cushion for supporting said rods, a plunger, an upper die member supported on said plunger concentric with said lower die member and having a corresponding conical portion, and a member concentric with said upper die member for first engaging the work and holding the same during operation.

4. A machine for the purpose described, comprising means for supporting a roller bearing cage, dies arranged at opposite ends of said supporting means, yieldably actuated means for holding said cage in place, and means for successively relatively moving said supporting means and one of said dies and said supporting means and the other of said dies.

5. A machine for the purpose described, comprising a bed, a die member supported thereon, work supporting means concentric with said die member, means for yieldably supporting said work supporting means, a plunger, means upon said plunger for holding the work in place, a second die member concenctric with said first-mentioned die member and mounted on said plunger, and means for yieldably forcing said work holding means into engagement with the work.

In testimony whereof I affix my signature.

JEREMIAH BINGHAM.